(12) United States Patent
Hurvig et al.

(10) Patent No.: US 6,507,592 B1
(45) Date of Patent: Jan. 14, 2003

(54) APPARATUS AND A METHOD FOR TWO-WAY DATA COMMUNICATION

(75) Inventors: Hans Hurvig, Copenhagen K (DK); Henrik Hvidtfeldt, Værløse (DK)

(73) Assignee: Cisco Cable Products and Solutions A/S (AV), Saborg (DK)

( * ) Notice: Subject to any disclaimer, the term of this patent is extended or adjusted under 35 U.S.C. 154(b) by 0 days.

(21) Appl. No.: 09/349,236

(22) Filed: Jul. 8, 1999

(51) Int. Cl.⁷ .................................................. H04J 3/08
(52) U.S. Cl. ........................................ 370/503; 370/509
(58) Field of Search ................................ 370/503, 394, 370/509, 516, 517

(56) References Cited

U.S. PATENT DOCUMENTS

| | | | |
|---|---|---|---|
| 5,517,505 A | 5/1996 | Buchholz et al. | 370/356 |
| 5,689,507 A | * 11/1997 | Bloks et al. | 370/389 |
| 5,809,252 A | 9/1998 | Beighe et al. | 395/200.57 |
| 5,966,387 A | * 10/1999 | Cloutier | 370/516 |
| 6,243,369 B1 | * 6/2001 | Grimwood et al. | 370/335 |
| 6,339,601 B1 | * 1/2002 | Seong et al. | 370/503 |

FOREIGN PATENT DOCUMENTS

| | | |
|---|---|---|
| EP | 0768769 A2 | 4/1997 |
| EP | 0774753 A2 | 5/1997 |
| WO | WO 9630905 | 10/1996 |

\* cited by examiner

*Primary Examiner*—Chau Nguyen
*Assistant Examiner*—Ron Abelson
(74) *Attorney, Agent, or Firm*—Beyer Weaver & Thomas, LLP

(57) ABSTRACT

The present invention provides an apparatus and a method which facilitate a flexible management of data packets in a Time Division Multiplexed System for data communication. The present invention also provides an apparatus which can rapidly be adapted to evolving communication protocols, and as such provide short time-to-markets for new and/or enhanced apparatuses. Consequently, the present invention is capable of rapidly providing comparable e.g. cable modem to the market in response to revisions of existing communication protocols and to development of new communication protocols.

38 Claims, 8 Drawing Sheets

APPARATUS AND A METHOD FOR TWO-WAY DATA COMMUNICATION

FIELD OF THE INVENTION

The present invention relates to an apparatus such as a cable modem and a method which support two-way communication of data packets between a head-end system and the cable modem in a Time Division Multiplexed System. A communication channel such as a Hybrid Fibre Coaxial (HFC) channel or a microwave link may be utilised by a service provider to transmit information to homes of multiple users and simultaneously provide a narrow band return channel for each user's data to the service provider.

In particular, the present invention relates to an interface unit and method which are capable of supporting a software implemented management of received/transmitted data packets within a cable modem operating in the Time Division Multiplexed System.

BACKGROUND OF THE INVENTION

With the recent rise in popularity of the Internet and other public or dedicated networks for electronic information exchange, many home computer users are using a modem to access e.g. the Internet through a Public Switched Telephone Network (PSTN) using home telephone lines. In this situation, the PSTN provides a dedicated communication path or circuit from the user's modem to a server located at e.g. an Internet Service Provider. The server functions as a gateway to the Internet. However, the bandwidth of typical home telephone lines is relatively small and/or the modems are typically capable of operating only at channel bit rates below approximately 56 Kbit/s, which limits the speed at which information can be received. Other modem technologies based on the PSTN such as ADSL require that the service provider installs a dedicated modem for each connected user, due to the need for a dedicated communication channel to each user's home. As an alternative to using telephone lines, the Internet can be accessed through HFC channels using a cable modem or a set-top box. HFC channels may provide much greater bandwidth than home telephone lines and are widely available to existing cable television subscribers. However, unlike telephone lines, existing HFC channel infrastructure does typically not provide a dedicated path or channel to the home of the users. Instead, multiple users are usually coupled to the same HFC channel leading to a head-end system which may be located at an Internet Service Provider's site. In addition, analogue or digital television signals are also frequently sent on the same HFC channel. Therefore, Internet service providers that use HFC channels must send and receive both data packets that contain information data, and control packets. The control packets provide the cable modem with information needed to send and receive the data packets, such as what carrier frequency outgoing or upstream packets from the cable modem should be transmitted on, what should its transmitter power level be, how many packets may be transmitted, what data packets on the HFC channel are intended for the cable modem, etc. Accordingly, the control packets provide a mechanism that allows a plurality of users organised in a shared-channel type of structure to communicate with the head-end system. The shared structure typically allows as many as one thousand users to simultaneously communicate with a single common modem forming part of the head-end system. Furthermore, the use of the shared channel provides statistical relief for burst traffic typically generated by Internet applications, so to an Internet user, it may appear that the entire downstream and upstream bandwidths are available on request. Accordingly, by utilising cable modem technology, a service provider can deliver cost effective high speed data communication services to thousands of users with a relatively limited investment in modem hardware and by utilising the existing HFC channel infrastructure.

An important class of cable modems are those operating according to the specifications provided by the European Telecommunications Standards Institute (ETSI) in ETS 300 800: Digital Video Broadcast Interaction Channel for Cable TV Distribution Systems. This specification details a Time Division Multiplexed System for two-way data communication between a head-end system in this context denoted an Interactive Network adapter (INA) and multiple cable modems denoted Network Interface Units (NIUs) located at the homes of the users. The upstream transfer of data from the plurality of users allocated to a particular INA may be divided into time slots and each time slot allocated to a particular user of the multiple users, by utilising Time Division Multiple Access (TDMA) techniques. The TDMA protocol specified in the DVB standard utilises a slotting methodology which allows transmit start times of each of the multiple of NIUs to be synchronised to a common clock source provided by the INA. Synchronising the start times increases message throughput of the shared data channel since the transmitted data packets do not overlap during transmission.

According to the DVB standard, control packets are denoted Media Access Control (MAC) packets or frames. Each NIU contains a unique MAC address which may be hard-coded into the NIU. Consequently, dedicated data may be transmitted from the INA to any particular users cable modem or NIU operating in the data transmission network. Synchronisation of upstream data packets is provided by transmitting some MAC frames which contain a specific time indicator for upstream synchronisation of slots. This time indicator contains information that allows a modem CPU or other data processor to calculate the time at which the modem is allowed to transmit an outgoing data frame to the head-end system if the arrival time of the MAC frame containing the indicator is known. A MAC frame containing the time indicator shall be sent at least in every time period of 3 ms according to the DVB standard. Accordingly, the time indicators provide a mechanism that allows NIUs to operate with the same time reference or clock so that the INA can assign time slots to different users' modems so as to avoid collision of data between different users. However, since there is a slightly different propagation delay between the NIUs in the data transmission network, a time base ranging method must be utilised to compensate for this NIU specific delay. Each NIU is provided by a specific delay time value which has been measured by the INA in a communication session comprising transmitting upstream ranging frames.

Prior art cable modems or set-top boxes have traditionally been based on specialised processors and various dedicated circuitry for receiving and processing incoming data packets as well as generating, encoding etc. outgoing data packets. These specialised processors have traditionally been hardwired so as to apply a dedicated decoding process, i.e. a substantially fixed set of operations, to the received data packets in correspondence with the communication protocol of the network in question. The hardwired processors have typically been manufactured in CMOS technology as standard-cell designs or gate-array designs since these design methods are capable of providing the number of gates and/or gate density required for such complex Application Specific Integrated Circuits (ASICs). The hard-wiring has previously been assumed necessary to accommodate real time requirements for downstream data packet reception and decoding and for upstream data packet generation and encoding imposed by the high data rate of the received/transmitted data packets. In MPEG transport streams, the data rate of received or down stream data packets at the NIU or cable modem is typically about 42–56 Mbit/s while the upstream/transmitted data rate from the NIU to the INA is about 256 Kbit/s–3.088 Mbit/s.

There are several drawbacks related to the use of hard-wired processors in cable modems. One drawback is that a substantial time period is required to designing, manufacturing, testing and production preparing a new or upgraded hard-wired processor. Such upgraded processors are often required to implement a new/revised or enhanced communication protocol or just to keep up with evolving communication protocols. For a new communication product, such as a cable modem, a long time-to-market is of course damaging for the profits that a manufacturer can expect from the product sales during its life cycle. Another drawback of the hard-wired approach is that debugging of new designs during e.g. prototype testing is quite difficult. This is due to the hard-wired architecture of the processor that makes it difficult, and thereby time consuming, or even impossible to modify processing steps in the processor and monitor whether any observed error in the data processing.

In contrast, a cable modem according to the present invention may provide a highly flexible protocol handling of two-way data communication between e.g. a cable modem and a head-end system. This flexibility may be accomplished by utilising a software controlled microprocessor to manage the decoding and processing of received data packets as well as to generate and encode outgoing data packets. A such software controlled management of data packets further provides a significant decrease in development time and development costs of new generations of cable modems offering new and/or enhanced features.

SUMMARY OF THE INVENTION

It is an object of the invention to provide an apparatus and a method which facilitate a flexible management of data packets in a Time Division Multiplexed System for data communication.

It is also an object of the invention to provide an apparatus, which can rapidly be adapted to evolving communication protocols, and as such provide short time-to-markets for new and/or enhanced apparatuses. Consequently, the present invention is capable of rapidly providing compatible e.g. cable modems to the market in response to revisions of existing communication protocols and to development of new communication protocols.

A basic philosophy of the apparatus and the method provided by the present invention has been to provide a solution wherein the management, such as reception, decoding, generation and encoding of data packets, may be controlled by software running on e.g. a microprocessor rather than being controlled by a dedicated hard-wired processor operating according to a number of fixed and predetermined processing steps.

DESCRIPTION OF THE INVENTION

One aspect of the invention relates to an apparatus for two-way communication of data in a time division multiplexed system, and comprising clock generator means for generating first and second clock signals, processor means for receiving the first clock signal and processing received data packets, an interface unit for receiving and intermediately storing incoming data packets from a head-end system and for intermediately storing and transmitting outgoing data packets to the head-end system, the interface unit comprising:

time base means for receiving the second clock signal and generating a current time stamp value, input buffer means for receiving data of the incoming data packets, the input buffer means comprising:

means for sampling the current time stamp value and associating the value with at least some of the incoming data packets, the time stamp value indicating an arrival time of the respective data packet, and data transfer means adapted to transmit data of the incoming data packets with any associated time stamps to a memory of the interface unit, and output buffer means for transmitting data of the outgoing data packets and comprising:

data transfer means adapted to receive data of the outgoing data packets with associated time stamps from the memory of the interface unit, and means for comparing the time stamp value of each outgoing data packet with the current time stamp value, and for transmitting an outgoing data packet to the head-end system when said values match a predetermined relationship, the processor means being adapted to generate and associate the output time stamp with each outgoing data packet, the output time stamp indicating a departure time of the data packet, the output time stamp value being related to input time stamp values of selected incoming data packets.

thereby permitting correct time-slot alignment of outgoing data packets in the time division multiplexed system.

In the present specification and claims, the term "apparatus" designates one or several pieces of electronic equipment which, as a whole, comprise(s) all the units, modules or circuit blocks that characterise the invention as stated above. Accordingly, the apparatus may appear as a distributed system where individual modules or units are not located in close physical proximity to each other. As an example of this architecture, the interface unit may be physically located on e.g. a Personal Computer (PC) card of a first PC while the processor means may be located on another circuit board or card of the same PC, or even within a second PC sharing a communication channel with the first PC. Furthermore, the processor means may, in this context, be constituted by an existing microprocessor of the first and/or second PC which transfers the incoming/outgoing data packets to/from the interface unit over an existing data bus within the PC, e.g. an industry standard PCI bus as commonly provided in today's PCs. In this situation, the microprocessor may run a data packet management program responsible for managing the received/transmitted data packets of the time division multiplexed communication system at the same time as running ordinary application programs such as word processing programs, Internet browser programs, spreadsheet programs etc.

The term "apparatus" also designates a substantially self-contained piece of electronic equipment such as a cable modem or set-top box substantially comprising all the relevant modules or circuit blocks in close physical proximity of each other within a dedicated housing or casing. In this situation, a software controlled industry standard microprocessor such as a PowerPC® or a Pentium® processor or any other suitable RISC/embedded processor may be provided to manage generation, decoding etc. of the received/transmitted data packets.

The interface unit may comprise a dedicated memory area or device that intermediately stores the incoming data packets including packets with associated time stamps. Alternatively, the incoming data packets may be stored in a memory area which is allocated in an existing memory structure or area in the apparatus, such as a system memory area utilised by the processor means for e.g. application program storage and/or data storage. In the last situation, the interface unit additionally comprises that allocated area of the system memory and the term "interface unit" mostly refers to a logical partitioning of the present apparatus rather than referring to any particular hardware partitioning of the system. The input buffer means that stores data of the incoming data packets and generates associated time stamps may be adapted to solely store a few bytes, such as 4–128 bytes or more preferably 16–64 bytes, of an incoming data packet at time. The transfer of the complete incoming data packet as well as any associated time stamp may be accomplished by transferring a number of "data portions" to the memory provided therefore in the interface unit. Alternatively, the input buffer means may store one or several complete and, optionally, time stamped data packets before it/they is/are transferred to the interface unit memory. The input buffer means and the output buffer means may have a number of associated device registers which may control specific parameters of the data reception and transmission processes, e.g. starting or suspending the reception of incoming data packets, the number of bytes of an incoming data packets which is stored at a time in the input and or output buffer means and activating a frame header filter etc. The device registers are preferably available for reading and writing by a data packet management program running on the processor means so that the parameters of the data reception and transmission processes can be modified in software.

In the present specification and claims, the term "processor means" designates any conventional or proprietary processor or microprocessor such as a hardwired proprietary processor or finite state machine, Read Only Memory (ROM) or software programmable microprocessor as well as combinations thereof capable of providing the required management of received/transmitted data packets. According to a preferred embodiment of an apparatus according to the invention, the processor means are provided in the form of an embedded PowerPC® microprocessor comprised within an ASIC that integrates most of a functionality of a cable modem adapted for operation in a Time Division Multiplexed System operating according to the communication standard set forth in ETS 300 800.

Each outgoing data packet is provided with an associated output time stamp value indicating a departure time of the data packet. This association may be implemented by a number different methodologies. The processor may directly generate and insert the relevant output time stamp value into each outgoing data packet at a predetermined position in the packet and subsequently transfer the time stamped outgoing packet to the interface unit memory area. The output buffer means may be adapted to read and transfer the outgoing packets to the output buffer means. The time stamp insertion in the outgoing data packets may be performed before or after the data or "content" of the packet has been generated or determined by the processor, since the value of the time stamp is determined based on arrival time information of selected incoming data packets. The output time stamp value associated with each outgoing data packet may also be generated by the processor means in a coded format so that a "coding data packet" may contain information relating to the departure time of one or several subsequent packets or even preceding packets (which may still be stored in the output buffer means awaiting departure). In this situation, the one or several subsequent or preceding packets may not need a time stamp of their own, since these packets are provided with respective departure time values relative to other packets. Accordingly, the relevant output time stamp value or values for such packets without their own time stamp may be decoded from the information contained in the relevant packet by means of decoding circuitry provided therefore in the output buffer means.

The means provided for sampling the current time stamp value may be adapted so as to be controlled by a synchronisation signal provided by a Radio-Frequency (RF) demodulator circuit connected to a physical data interface carrying the data packets or frames. Subsequent to receiving and recognising e.g. a MPEG frame, the RF demodulator may generate a synchronisation signal explicitly marking the arrival time of the received MPEG frame. This synchronisation signal may subsequently be directly or indirectly used to control the sampling of the time base means of the input buffer means, thereby providing a highly accurate timestamp value indicating the arrival time of the frame.

When a MPEG stream have been received via the input buffer means and stored in the allocated memory area of the interface unit, the processor means may be adapted to read and decode the stored MPEG frames and subsequently select MAC frames that contain a DVB MAC protocol specific 3 ms time indicator. This allows the processor means of any particular cable modem to calculate the correct output time stamp value for any particular outgoing data frame by utilising the 3 ms time indicator(s) of the selected MAC frame(s) and the arrival time stamp value or values of the selected MAC frame(s) together with previously transmitted information related to the modem's allocated upstream slot number and its time base ranging value.

Some or all of the incoming data packets may be provided with respective time stamp values, preferably, each incoming data packet is provided with a corresponding time stamp value, since this methodology simplifies the digital hardware design and secures that all MAC frames that allows a user to transmit upstream data frames can be properly recognised and processed to maximise the users upstream message throughput.

According to a preferred embodiment of the invention, these arrival time stamp values are associated with each of the incoming data packets by inserting the time stamps into the respective data packets. For downstream transmittal of MPEG data packets or frames, a frame comprises 188 bytes and time stamps may be added as 32 bit or 4 byte values to the start of each frame so that a time stamped frame will contain a total of 192 bytes.

The clock generator means of an apparatus according to the present invention may comprise a single or several clock generators generating a first and a second clock signal. According to a preferred embodiment of the invention, the first clock signal and the second clock signal are substantially identical, i.e. of substantially same magnitude and phase. In this embodiment, the substantially identical clock signals could be the system clock signal of the apparatus and accordingly utilised to clock the processor means and the time base means. An advantage of this methodology is that clock domain related problems are avoided, thus simplifying design and verification procedures of interfaces between circuits blocks operating in different clock domains. Alternatively, the clock generator means may be adapted to generate the first clock signal and the second clock signal synchronously with respect to each other, i.e. with differing frequency and/or phase.

A single clock generator may generate a single clock signal constituting both the first and the second clock signal or a number of different clock signals with a higher and/or lower fundamental frequency than the corresponding fundamental frequency of the single clock generator through commonly known frequency multiplication and/or division techniques. Alternatively, several differing clock frequency signals may be generated by providing a corresponding number of different clock generators.

Preferably, the clock generator means generates a clock frequency signal of at least 1 MHz such as about 10 MHz or even more preferred over at least 33 MHz such as at least 66 MHz or 100 MHz. Generally, by providing higher clock frequency signals to the time base means, a better time resolution of the arrival time and departure time for incoming and outgoing data packets, respectively, is made possible.

The time base means of an apparatus according to the present invention may comprise at least one counter operating synchronously to the second clock signal. The synchronous operation with respect to the second clock signal can be accomplished by directly clocking the at least one counter with the second clock signal or with a delayed, scaled or divided/multiplied clock signal based on the second clock signal. The at least one counter is preferably of the binary counter type so that the value of a this counter provides a measure of the current time value modulo $2^N$, wherein N is an integer number. Preferably, a binary counter having a N value between 8 and 64 such as about 32 is utilised. A 32 bit counter, counting modulo $2^{32}$, will wrap around at about 65 seconds time intervals, if the counter is clocked at 66 MHz. The size of N may accordingly be scaled to the requirements of any particular application by taking into consideration the maximum unambiguous time interval that the counter must be able to resolve and the clock frequency at which it is operated.

By appropriately sampling the value of the at least one counter, as explained above in connection with using the synchronisation signal provided from e.g. the RF demodulator, a current time stamp value can be obtained and associated with e.g. the arrival time of a data packet.

According to a preferred embodiment of the invention, the time base means comprises a counter operating synchronously to the second clock signal to provide a current time stamp value of incoming data packets, and the comparison means are adapted to utilise the current time stamp value of the counter to control departure times of outgoing data packets. By using the same counter to generate an arrival time stamp value of an incoming data packet as to control the departure time of an outgoing data packet, the interface unit hardware (often equivalent to gate count) is minimised and the timing precision is substantially equal to the precision of the clock generator means on which the second clock signal is based. Since a typical clock generator of the apparatus comprises a high precision quartz crystal based clock source, the timing of the departure time of an outgoing data packet relative to the arrival time stamp value of incoming data packets is highly accurate and easily complies with the sub-microsecond precision requirement of the DVB MAC protocol. Furthermore, the comparison means are preferably adapted to transmit an outgoing data packet when there is simple equality between the current time stamp value and the output time stamp value of an outgoing data packet to minimise the amount of circuitry required to implement this comparison function.

The interface unit memory area may be adapted to intermediately store one or several incoming data packets with associated time stamps at a time. Preferably, at least two incoming data packets, such as more than 10 data packets, or even more preferably at least 50 incoming data packets, with associated time stamps are stored at a time. By storing a large number of incoming data packets at a time, the processor overhead related to initialising and completing an interrupt routine performing reading and decoding of the large number of data packets, is made smaller. Consequently, computing resources of the processor are relieved to perform other essential data packet management operations. The downside of this methodology is that if too many incoming data packets are stored before the interrupt routine is initialised and running, at the time where the processor starts decoding these packets and recognises e.g. a MAC frame that allows upstream data packet transfer of user requests, the designated departure time of a such upstream data packet may already have expired.

According to a preferred embodiment of an apparatus according to the invention, the management of the incoming/outgoing data packets such as reading, checking, intermediately storing, decoding, output time stamping etc. those packets is performed by software running on the processor means. This software is accordingly responsible for correctly managing the incoming and outgoing data packets so as to make the apparatus comply with the relevant communication protocol or protocols of the Time Division Multiplexed System in which it operates. Preferably, this data packet management software is designated "firmware" and stored in an EEPROM or a flash memory device housed in the apparatus or, alternatively, integrated on the ASIC that also contains the processor. The apparatus may additionally comprise means for receiving remote instructions modifying the software running on the processor means so as to modify the management of the incoming and/or outgoing data packets. Accordingly, a cable modem may be provided with software updates and/or bug fixes from e.g. a central computer located at a modem manufacturers residence. In this way, a simple, fast and very cost effective method of providing cable modem users with new modem features may be provided.

This software controlled approach to data packet management is made possible by the implemented data packet time-stamping procedure within the interface unit. The time stamping relieves the processor from having to instantly accommodate the real time requirements of downstream data packet reception and decoding imposed by the high data rate of the received/transmitted data packets. The software controlled approach to data packet management in e.g. cable modems is a major advantage in comparison with prior art cable modems or set-top boxes, which traditionally have been based on specialised hard-wired processors and various-dedicated circuitry as previously explained. Alternatively, according to another embodiment of the invention, the software controlled approach to data packet management may be implemented by providing a part or all of the firmware functionality in a metal mask programmable program ROM forming part of the ASIC that also comprises the processor. This solution will still provide a faster turn-around time for updating and/or bug fixing the firmware functionality of the data packet management in the cable modems or set-top boxes than the turn-around time of traditional hard-wired processors. The metal mask programmable ROM based solution for controlling the processor may in some applications provide a more cost effective modem solution in terms of manufacturing costs than the approach based on flash memory/EEPROM.

A second aspect of the invention relates to a method for two-way data communication in a time division multiplexed system, the method comprising the steps of:

generating first and second clock signals, providing the first clock signal to processor means, generating a current time stamp value based on the second clock signal, providing input buffer means receiving data of incoming data packets from a head-end system, sampling the current time stamp value and associating the sampled value with at least some of the received incoming data packets, the time stamp value indicating an arrival time of the respective data packet, transferring the data of the incoming data packets including data of data packets with associated time stamps to a memory of an interface unit, generating output time stamps, each stamp having a value related to input time stamp values of selected incoming data packets, generating outgoing data packets and associating the output time stamps with each outgoing data packet, the output time stamp value indicating a departure time of the outgoing data packet, transferring data of the outgoing data packets with associated time stamps from the interface unit to output buffer means, comparing the time stamp value associated with each outgoing data packet with the current time stamp value, transmitting data of an outgoing data packet from the output buffer means to the head-end system when said time stamp values match a predetermined relationship, thereby permitting correct time-slot alignment of outgoing data packets in the time division multiplexed system.

The method may comprise intermediately storing complete incoming data packets including complete data packets with time stamps in the input buffer means or the method may comprise just storing 8–64 bytes (equalling 2–16 d-words of 32 bits) long "data chunks" of each of the incoming data packets in the input buffer means at a time. These complete data packets or "data chunks" may be directly transferred to a dedicated memory area of the interface unit by means of a Direct Memory Access transfer controlled by the input buffer means. Alternatively, the method may comprise transferring the complete data packets or "data chunks" to the dedicated memory area of the interface unit under control of the processor means.

The method may further comprise the step of connecting a Radio-Frequency demodulator circuit to a physical data interface carrying the data packets, providing a synchronisation signal generated by the Radio-Frequency demodulator circuit, and sampling the current time stamp value based on the synchronisation signal. This synchronisation signal may be generated inside the RF demodulator circuit in response to detecting the arrival of a particular type of data packet or frame. According to a preferred embodiment of the present method, the method comprises the step of inserting the time stamp value associated with an incoming data packet into the data packet. Accordingly, the time stamped data packet which stored in the interface unit memory may be a number of bytes longer, such as 4 bytes longer if 32 bit time stamps are utilised, than the received data packet. For MPEG frames of a length of 188 bytes, a such 4 bytes memory overhead per time stamped frame can be considered negligible. Preferably, the method further comprises the step of additionally inserting an output time stamp into each of the outgoing data packets.

The time base means preferably generates the current time stamp value by operating at least one counter synchronously to the second clock signal. Preferably, the second clock signal is a clock signal substantially identical to the first clock signal both having a frequency within the range between 10 and 100 MHz. According to a preferred embodiment of the present method, the current time stamp value is generated by operating a counter synchronously to the second clock signal and by sampling the value of this counter to generate the arrival time stamps for incoming data packets and to further compare this counter value with the time stamp value of each outgoing data packet and transmit the outgoing data packet when said values match.

A third aspect of the invention relates to a computer program for managing incoming data packets and generating outgoing data packets in an apparatus which provides two-way data communication in a Time Division Multiplexed System, the computer program performing the steps of:

reading time stamped data packets from a memory of an interface unit, the time stamps indicating arrival times of the respective data packets, decoding the received data packets, determining whether a packet comprises a time indicator that indicates allowance of upstream transmittal of an outgoing data packet and a predetermined departure time, selecting at least some data packets comprising the time indicator, generating the outgoing data packet, calculating the output time stamp value associated with the outgoing data packet based on the time indicator and the arrival time stamp value of at least one selected data packet and additional transmit time information stored in the apparatus, intermediately storing the time stamped outgoing data packet in the memory of the interface unit, so as to allow output buffer means to read and transfer data of the outgoing time stamped data packet to output buffer means that controls the departure time of the data packet based on its associated time stamp value.

The computer program for data packet management is preferably adapted to be running on an industry standard microprocessor such as a PowerPC® processor. Most of or the entire program code is preferably stored in a Flash Memory and/or EEPROM device(s) provided within the apparatus so as to allow fast and even remote software updates and bug fixes.

The computer program may further be adapted to perform the step of: reading data based on user generated requests and generating outgoing data packets in response to the user data. This situation is typically relevant for users surfing the Internet, but as well for many other types of two-way data communication. For two-way data communication according to the DVB standard ETS 300 800, the computer program may be adapted to select incoming Media Access Control packets that contains the 3 ms time indicator of a MPEG data stream, and to generate the value of the output time stamps associated with the outgoing data packets based on the input time stamp value or values of those MAC packet or packets which contained the time indicator. The present computer program could be recorded, stored and distributed on any suitable data carrier such as hard-discs, floppy-discs, CD-ROMs, DAT-tapes, EEPROM devices, EPROM devices, PROM devices etc.

BRIEF DESCRIPTION OF THE DRAWINGS

A preferred embodiment of a cable modem according to the invention is described in the following with reference to the drawings, wherein.

DETAILED DESCRIPTION OF A PREFERRED EMBODIMENT

In the following, a specific embodiment of an apparatus according to the invention is described and discussed in greater detail. The present description details relevant circuit blocks of a cable modem such as an interface unit, an input buffer, time base circuitry and an output buffer, comprised within an ASIC. Where contained within a cable modem or a set-top box, the ASIC is capable of implementing two-way data communication in a Time Division Multiplexed System operating according to the ESTI standard ETS 300 800: Digital Video Broadcast Interaction Channel for Cable TV Distribution Systems. The cable modem may be housed within or on various physical boxes or enclosures, such as a PCI plug'n play card for installation within a Personal Computer (PC), an external (to the PC) cable modem with an Ethernet connection to a PC or a Local Area Network (LAN) etc.

However, it will be understood, and will be realised by the person skilled in the art, that the invention is not limited to the presently discussed embodiment, and that each of the individual circuit blocks described in the present embodiment could be implemented in many other ways. In particular, it may be advantageous to integrate the interface unit in one or several programmable logic devices, such as Field Programmable Logic Arrays (FPGAs), PLDs etc. Similarly, some of the discussed hardware unit and circuit blocks and could be integrated into one (larger) block or broken down into smaller units or circuit blocks.

The description starts with a specification of input buffer means and associated time base means which in the present context are designated Input Stream Unit (ISU). Subsequently, an Output Stream Unit (OSU) constituting output buffer means and associated time base means is described. Finally, interface signals to relevant circuit blocks of the ASIC, such as a microprocessor block and a RF demodulator, is described in more detail.

Overview

Figure 1:
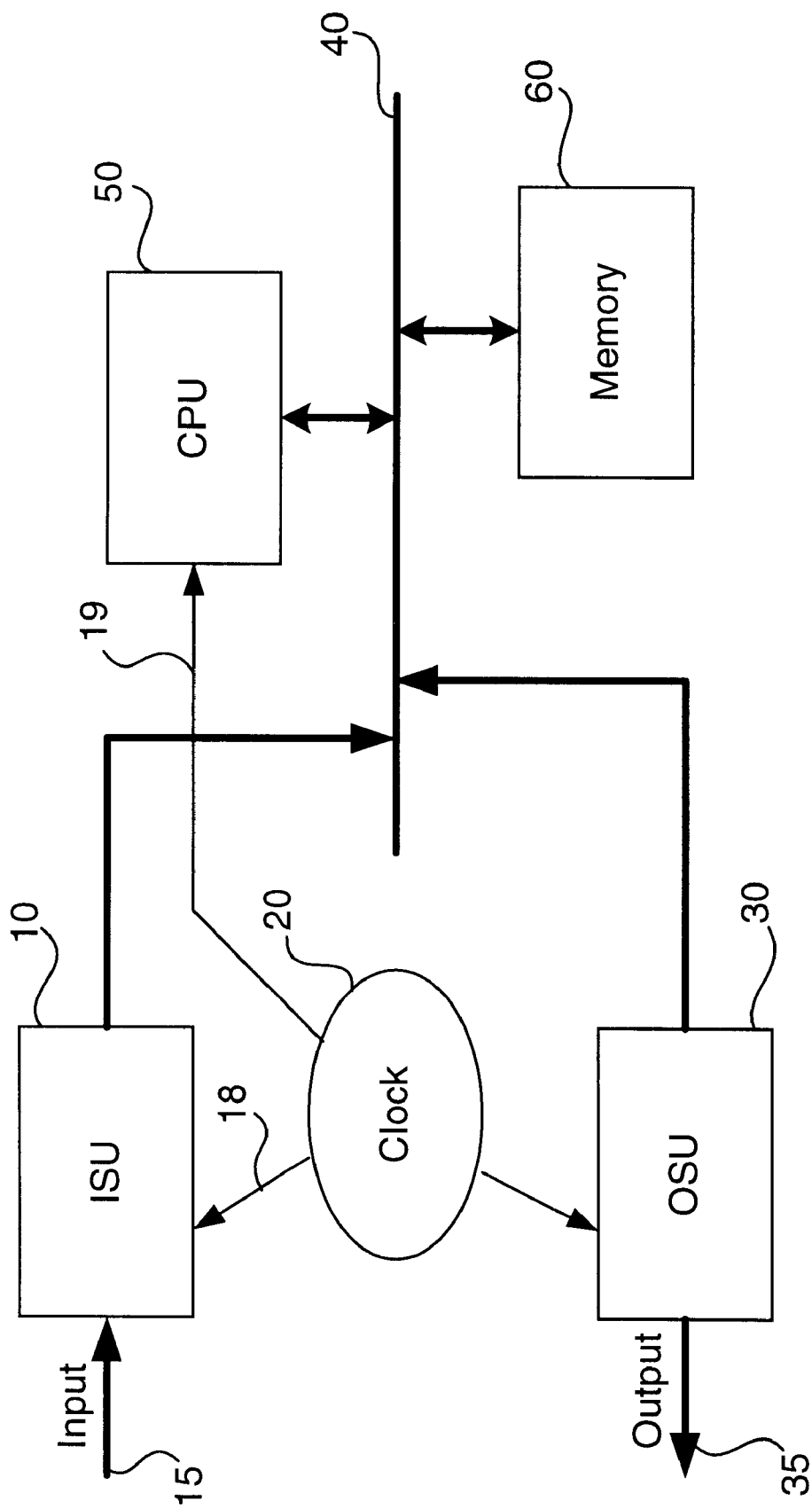
FIG. 1 is a block diagram of key circuit blocks illustrating an architecture of a cable modem according to the invention.
Figure 2:
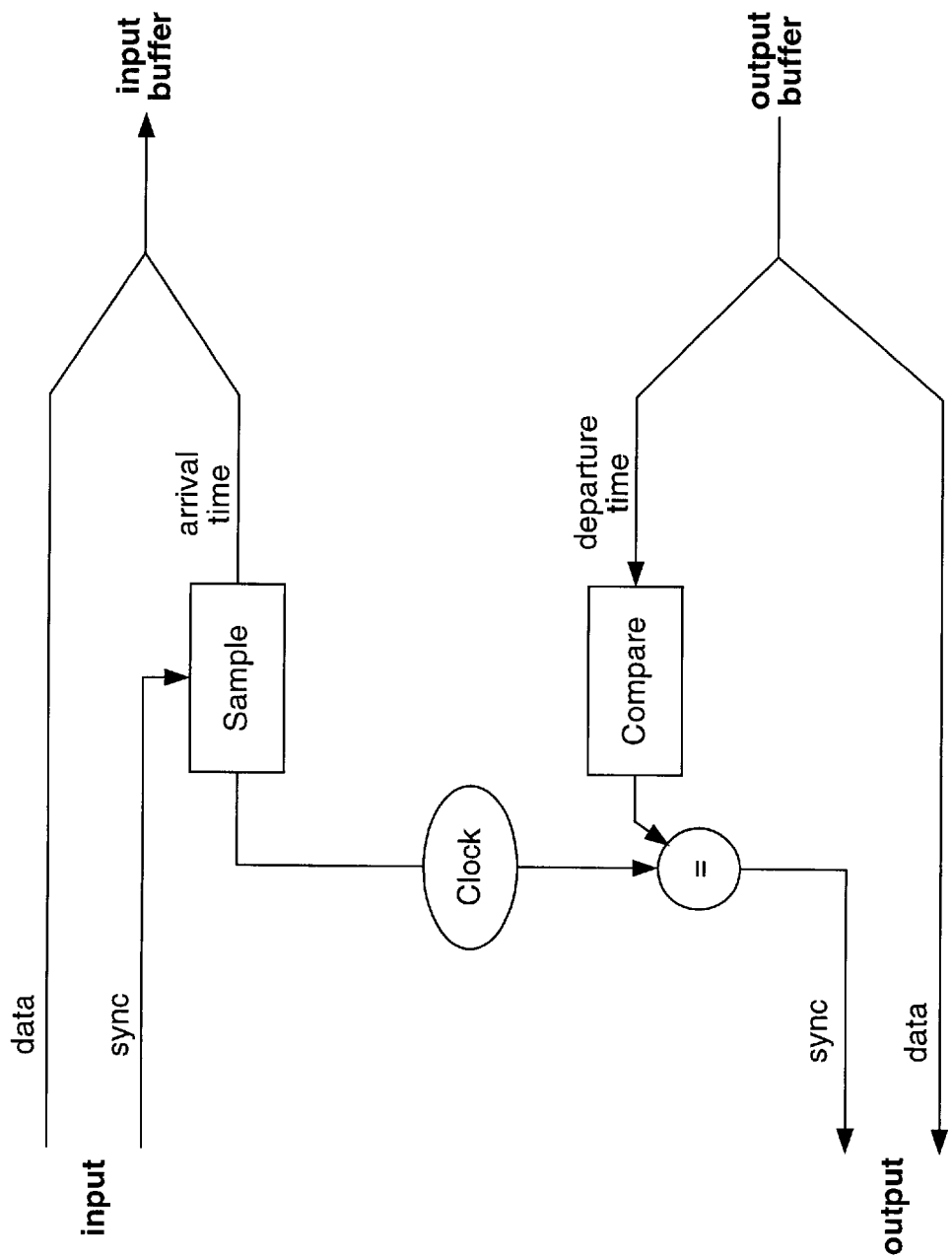
FIG. 2 is a block diagram illustrating generation of arrival time stamps for incoming data packets and comparison of output time stamp values of outgoing data packets with a current time stamp value.

In the cable modem block diagram of FIG. 1, incoming data packets are transferred to the ISU 10 through data interface 15 from a Radio-Frequency (R/F) module or circuit block (not shown). A clock generator 20 provides a first clock signal 19 to the processor or Central Processing Unit (CPU) 50 adapted to process data packets which are transferred from the ISU 10 by means of data bus 40. A free-running counter (item 105 on FIG. 3)), which is clocked by a second clock signal 18 based on the clock generator 20, provides a current time stamp value associated with each incoming data packet or frame. The counter circuit 105 may be comprised within the ISU 10. The ISU 10 preferably receives and stores eight 32 bit d-words, a total of 32 bytes of data of an incoming data frame at a time in a FIFO buffer 120. Preferably, a time stamp value is provided by sampling circuit 125 and inserted into each data frame 130. The ISU 10 may control the time of transfer of the eight d-word "chunks" of data to a frame memory area (not shown) which is a part of a system memory 60 of the cable modem by utilising a data bus 40 which provides direct memory access to the frame memory area that is adapted to intermediately store the received data frames with associated time stamps. Subsequently, a data frame management program running on the CPU 50 may fetch the intermediately stored frames the frame memory area and process these frames according to the specifics of the utilised communication protocol. The data packet management program further handles the generation of outgoing data packets which may be based on user entered requests for e.g. information residing on the Internet. The user may be located on a PC (not shown) having installed the cable modem in the form of a PCI plug'n play card.

When the data packet management program decoding the intermediately stored data packets or frames in the frame memory area detects a MAC frame which contain a specific time indicator for upstream synchronisation of slots, the value of the arrival time stamp which has been inserted into this frame is read and in response an output time stamp value indicating a departure time of an outgoing data frame is calculated, or otherwise determined, based on the value of the arrival time stamp and the time indicator of the MAC packet.

The determined output time stamp value and data "chunks" preferably consisting of eight d-words of an outgoing data packet are transferred to the OSU (30, FIG. 1). The output time stamp is transferred to a 32 bit compare register 710 and the eight d-words (a data "chunk") of the outgoing data frame is transferred to an output FIFO buffer 750. Comparison circuitry 730 determines when the value of the free-running counter 105 matches the value of time stamp in the compare register 710 and generates an output synchronisation signal 740 that controls the departure time of the outgoing data frame. The OSU (30, FIG. 1) is accordingly responsible for precisely controlling the departure time of outgoing data frames with respect to the respective output time stamps. By applying this methodology, any number of outgoing data packets, each comprising a time stamp indicating the departure time of the respective packet, may be generated by the data packet management program running on the CPU 50 and subsequently transferred to the OSU (30, FIG. 1) from the frame memory area in system memory 60.

Figure 3:
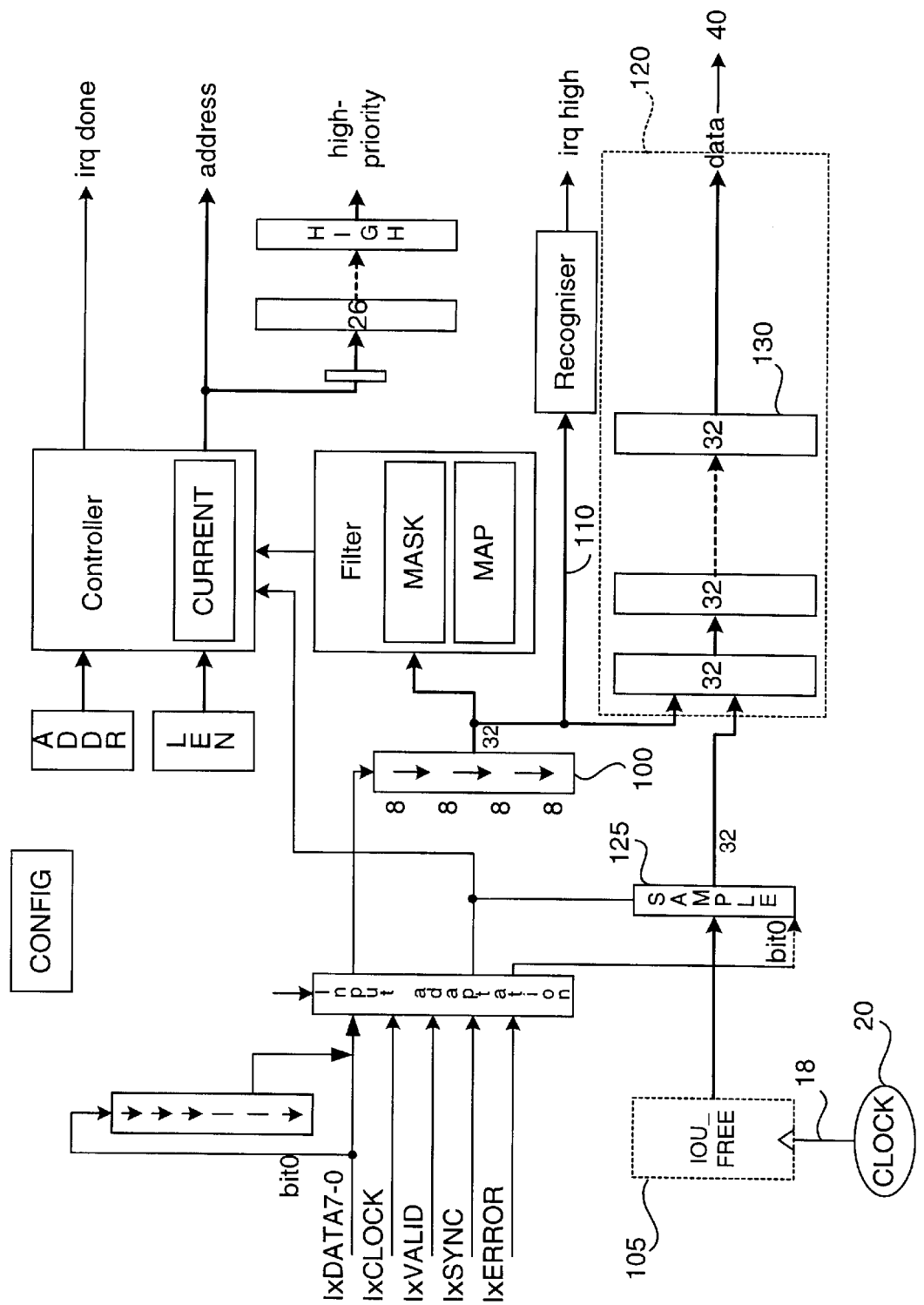
FIG. 3 is a block diagram of an Input Stream Unit (ISU) channel block diagram showing various circuit blocks comprised in one channel of the Input Stream Unit according to the present invention and further showing interface signals to/from the unit.

FIG. 3 shows one channel of the ISU 10 in more detail, the ISU 10 provides a high-bandwidth data-path from an external device, such as a Radio-Frequency (RF). demodulator (not shown) tuned to the relevant communication frequency of the communication system, into the cable modem. In DVB modem applications, the RF demodulator is connected to down-stream physical interfaces, and moves data from the cable of e.g. a HFC channel into the frame memory area which in the present embodiment is an allocated portion of the system memory (60, FIG. 1) where it subsequently can be processed by the CPU (50, FIG. 1). Bandwidths up to 10 Mbytes/s are supported, and the ISU (10, FIG. 1) may have an 4 or 8-deep d-word data FIFO buffer to handle latency in getting access to the frame memory area.

The incoming stream data are transferred via lines IxDATA7-0 from the RF demodulator to the ISU 10 and subsequently aggregated into frames of fixed size by a one-to-four shift register 100 which upsamples or converts four bytes of data to a 32 bit d-word. The size of these blocks is implicit, and must be known from the application context. For an MPEG data stream the frame size is 188 bytes. The start of each frame is indicated explicitly by an interface signal, IxSYNC, provided by RF demodulator in response to detecting the start of a MPEG frame. This signal is used to sample a free-running counter-circuit block 105 associated with the ISU 10 (FIG. 1) and may, accordingly, provide a system-clock precision time-stamp of the arrival time of each frame. The sampling of the counter module provides an arrival time value which is stored in the top 31 bits of a 32 bit d-word. The least significant bit may be set to an error-indicator of the physical device controlled by interface signal IxERROR. The full 32-bit sampled counter value is preferably stored in the beginning of the frame memory area and is immediately followed by the incoming stream data.

Figure 4:
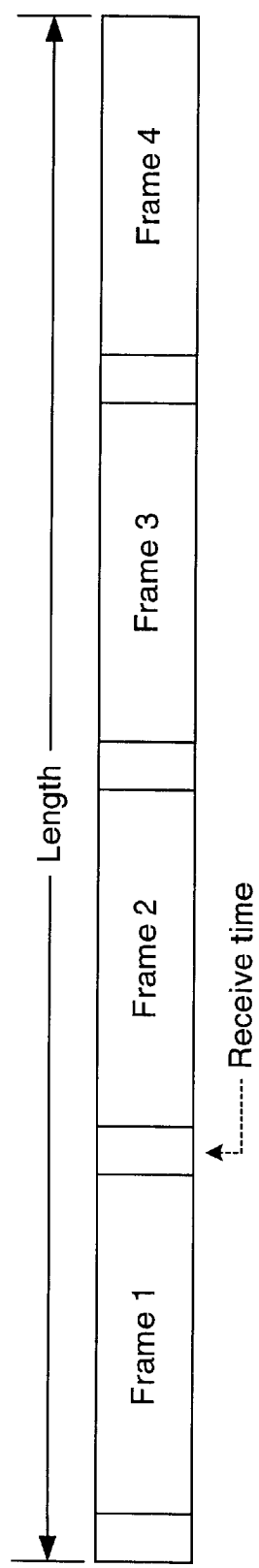
FIG. 4 illustrates an input buffer layout containing a number of time stamped incoming data packets.

FIG. 4 illustrates an exemplary layout of the input buffer channel of the ISU 10. The input buffer channel can contain multiple (individually time-stamped) frames, by setting the buffer length to the appropriate value. For MPEG frames it should be a multiple of 4+188=192 bytes, since the 32 bit time stamp requires a total of 4 bytes of memory space. The input buffer is preferably always filled with a whole number of d-words. If the (implicit) frame size is not a multiple of four, the frame buffer length is rounded up, and the last 1–3 bytes have undefined values. A buffer containing N frames of 21 bytes each should be (4+24)*N bytes long. Each d-word is built up using little-endian byte-ordering, so that the first byte arriving is stored as the first byte in the buffer, and so on. When the buffer is full the current operation is complete. A new operation can be pre-started into a separate memory buffer while the current operation is in progress. This allows for continuous data reception without any urgent need to assign a new buffer once the current buffer is full.

The ISU (10, FIG. 1) may comprise two identical channels, which can be used for simultaneous reception of an in-band and an out-of-band data stream. Each channel supports a bit-wise or a byte-wise interface to the external device. Each incoming data packet is time-stamped with system-clock precision, which allows firmware running on the microprocessor to determine exactly when a data frame arrived, even if there is a delay before processing it.

Otherwise it is preferred that the circuitry comprised in the ISU 10 is not specific to DVB data formats or to the MAC protocol. These issues, including synchronisation with the upstream data channel or path, i.e. correctly fitting outgoing data packets into their allocated time slots, are preferably handled by the firmware that provides the data packet management. The firmware may also exploit the filtering mechanism to implement a simple form of PID-based pre-filtering.

Note that the ISU 10 is not explicitly aware of the frame size of the incoming data stream. Therefore, if the RF demodulator in an error situation truncates a frame, and generates a premature start-of-frame indication for the next frame, the subsequent contents of the current buffer will be miss-aligned. In particular, the time stamps will not be at the expected positions in the buffer. Synchronisation is regained at the start of the next buffer, since streaming into the beginning of a buffer is always synchronised with the start-of-frame indication. Alternatively, the ISU 10 may be made aware of the frame size of the data stream and control circuitry may be added for determining the size of received frames and to skip frames that are too short due to e.g. communication channel noise corruption of some of the bits in the frame.

Filtering

Figure 5:
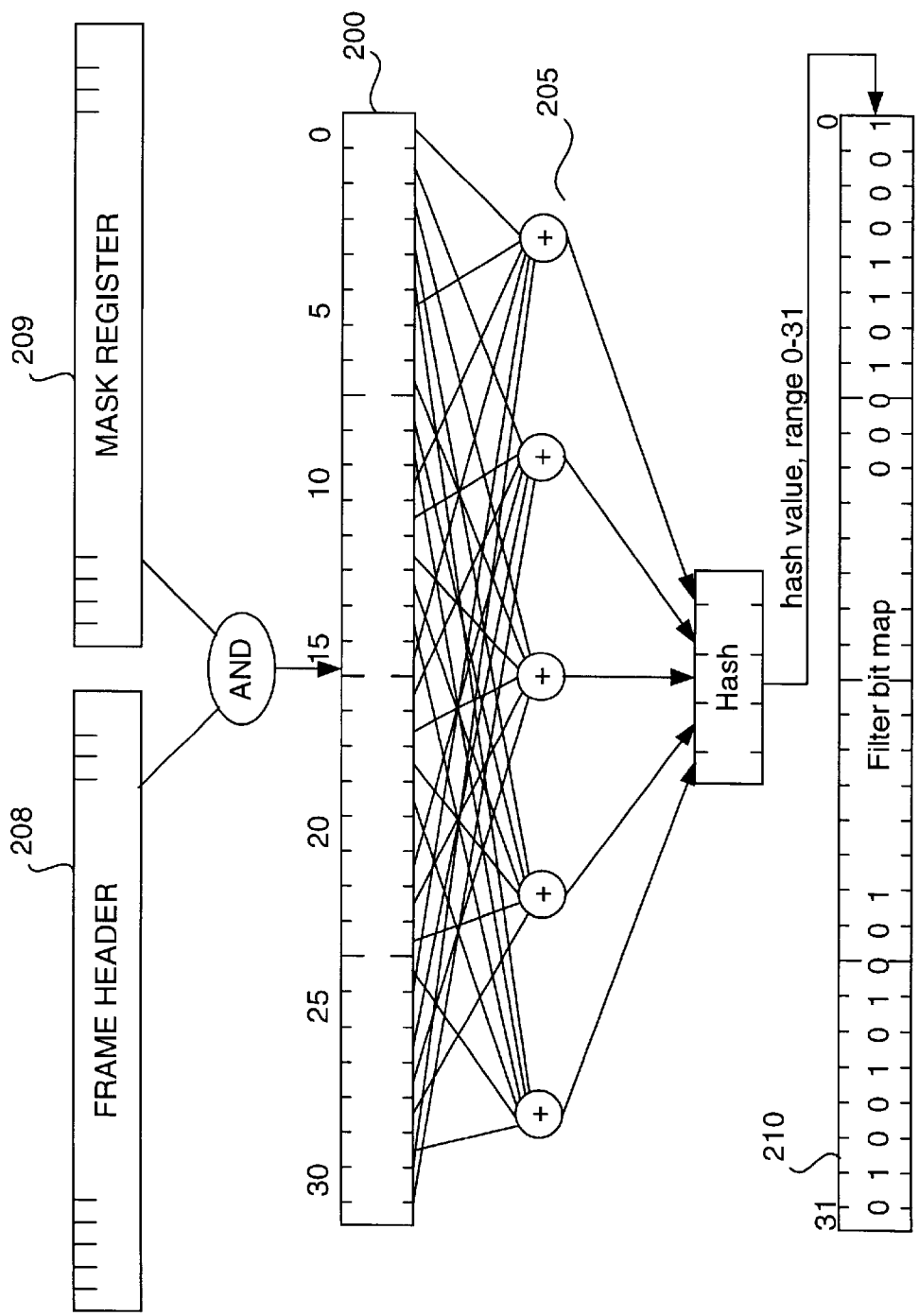
FIG. 5 illustrates a filtering process being applied to a frame header of a DVB MAC frame.

Each channel may also have a simple filtering mechanism, as illustrated in FIG. 5, which can be used to eliminate-unwanted frames before they even get written to the frame memory area. The ISU may also comprise a dedicated recogniser circuit for high-priority DVB Media Access Control (MAC) frames within a MPEG frame stream. Whenever one is detected, its address in the memory buffer is written to a small 4-deep address FIFO. Status signal irq-high (FIG. 3) indicates whether the FIFO is non-empty, the status signal can be used to generate an interrupt to the CPU.

When a frame header 208 consisting of the first 32 bits of each frame has been read from the RF demodulator, the ISU 10 immediately subjects the header to a simple form of filtering as explained below with reference to FIG. 5. If the filter does not accept the frame header, the frame is skipped in its entirety, and is never written to the frame memory area of the system memory. Preferably, this filter is based on a bitmap 210 containing 32 bits, stored in a register. A 32-bit mask register 209 is used to suppress unwanted bits from the frame header 208 by means of the illustrated AND operation that generates the contents of a masked frame header register 200. The significant bits of this masked frame header register 200 are turned into a 5-bit hash-value, which is used to select one of the bits of the bitmap 210, where the least significant bit of the bitmap register corresponds to hash value 0, and so forth. The frame is dropped if the selected bit is zero and accepted if it is a one and copied to the frame area. Setting all the bits of the bitmap 210 to ones effectively disables the filter. The hash value is calculated by XOR-ing every fifth bit of the frame header together, as illustrated in FIG. 5.

The filtering process illustrated in FIG. 5 is most useful if only a few patterns in the frame header indicate a wanted frame. The firmware running on the processor may be utilised to set the corresponding bits in the bitmap, leaving the remaining bits as zeroes, thereby eliminating invalid and/or unwanted frames (except false positive frames which may have a hash collision with a wanted pattern). As the number of patterns approach 32, most of the bits in the bitmap will be set, and the filter loses its effectiveness. However, the filtering process provides a major advantage in many applications of apparatuses for two-way data communication wherein a substantial percentage of incoming data frames may be irrelevant for the particular application supported by the apparatus. By skipping these irrelevant frames before they ever get written to the frame memory area and unnecessary traffic on the system memory bus is avoided and the CPU workload is minimised since the CPU does not need to process irrelevant data frames.

DVB MAC Recogniser

When the frame header consisting of the first 3×32 bits of each frame has been read from the RF demodulator, the ISU immediately subjects it to a recognition filter. If the frame is detected as a DVB MAC high priority frame the frame start address is stored in a FIFO. The recogniser is based on a 8-bit map register, which is used to select which bits in the frame header that makes the recogniser recognise.

The following scheme shows a preferred recogniser mechanism:

| Headline | Byte Offset | Bit 7 | Bit 6 | Bit 5 | Bit 4 | Bit 3 | Bit 2 | Bit 1 | Bit 0 |
|---|---|---|---|---|---|---|---|---|---|
| MPEG | +0 | — | — | — | — | — | — | — | — |
| Header | +1 | — | — | — | 0 | 0 | 0 | 0 | 0 |
|  | +2 | 0 | 0 | 0 | 1 | 1 | 1 | 0 | 0 |
|  | +3 | — | — | — | — | — | — | — | — |
| Upstream | +4 | 1 | — | — | — | — | — | — | — |
| Marker | +5 | — | — | — | — | — | — | — | — |
|  | +6 | — | — | — | — | — | — | — | — |
|  | +7 | — | — | — | — | — | — | — | — |
|  | +8 | — | — | — | — | — | — | — | — |
| MAC | +9 | 1 | — | — | 1 | — | — | 1 | — |
| FLG | +10 | — | 1 | — | — | 1 | — | — | 1 |
| CONTROL | +11 | — | — | 1 | — | — | 1 | — | — |

The recogniser detects the condition in the frame header:

"MPEG Header" and ("Upstrem marker" or HIGH_MAP & "MAC FLAG CONTROL"); where HIGH_MAP is

| HIGH_MAP | +0 | C7 | 0 | 0 | C6 | 0 | 0 | C5 | 0 |
|---|---|---|---|---|---|---|---|---|---|
|  | +1 | 0 | C4 | 0 | 0 | C3 | 0 | 0 | C2 |
|  | +2 | 0 | 0 | C1 | 0 | 0 | C0 | 0 | 0 | and where

C(7..0) is configuration bit 7-0 from the HIGH_MAP register.

In more words-like notation the function is:

(In the first d-word the 13 PID bits should be 0x001C ) and ((In the second d-word bit 7 should be 1) or (one or more of the selected MAC flags should be one) ).

Hardware Interface

The ISU owns two identical sets of external pins, each interfacing to a separate physical input device:

| Pin name | Type | Description |
|---|---|---|
| I1DATA0–7 | Input | Data from physical interface. For serial data, only bit 0 is used. |
| I1CLOCK | Input | Data clock signal from physical device, asynchronous to ASIC system clock. |
| I1VALID | Input | Data valid qualifier. |
| I1SYNC | Input | Frame start indicator. |
| I1ERROR | Input | Frame error indicator (optional). |
| I2DATA0–7 | Input | Data from physical interface. For serial data, only bit 0 is used. |
| I2CLOCK | Input | Data clock signal from physical device, asynchronous to ASIC system clock. |
| I2VALID | Input | Data valid qualifier. |
| I2SYNC | Input | Frame start indicator. |
| I2ERROR | Input | Frame error indicator (optional). |

Data is accepted bit-wise or byte-wise, as configured by firmware, synchronised to the input clock signal, IxCLOCK. The polarity of the IxCLOCK, IxSYNC and IxVALID signals are also, configurable by firmware. The data signals are only valid when IxVALID is asserted on the significant edge of IxCLOCK. Data are aggregated into logical frames of a fixed size. The external device flags the beginning of a frame by asserting the IxSYNC signal when the first bit/byte is being clocked through. Simultaneous with IxSYNC, the IxERROR signal is sampled and the value is made available to the firmware. It is not significant to the ISU 10 itself.

Firmware Interface

The ISU has, as previously mentioned, two channels which can be configured and operated independently. The firmware operates each channel by writing to a number of different registers detailed below, thereby activating it, and waiting until it signals the beginning or end of the current buffer. The ISU 10 is self-contained, and while it is filling a buffer the firmware can perform other tasks.

Registers

The first channel of the ISU 10 contains a number of device registers available to the firmware code as defined in table 2 below:

TABLE 2

| Register name | Number | Bits | R/W | Description |
|---|---|---|---|---|
| ISU_CONFIG | 0xC0 | 32 | r/w | Channel 1 configuration: |

TABLE 2-continued

| Register name | Number | Bits | R/W | Description |
|---|---|---|---|---|
| | | | | Bit 0: data width, 0=serial, 1=parallel |
| | | | | Bit 1: serial endian-ness, 0=LSB first, 1=MSB first |
| | | | | Bit 2: I1CLOCK polarity, 0=rising edge, 1=falling edge |
| | | | | Bit 3: I1SYNC polarity, 0=active low, 1=active high |
| | | | | Bit 4: I1VALID polarity, 0=active low, 1=active high |
| | | | | Bit 5: I1EROOR polarity, 0=active low, 1=active high |
| ISU_ADDR | 0xC1 | 26 | r/w | Address of memory buffer to receive data d-word aligned => ISU_ADDR(1..0) must be 0. |
| ISU_LEN | 0xC2 | 16 | r/w | Length of memory buffer in d-words. |
| ISU_CURRENT | 0xC3 | 16 | r | The frame currently being received.. |
| ISU_MASK | 0xC4 | 32 | r/w | Bit-mask for frame filtering. |
| ISU_MAP | 0xC5 | 32 | r/w | Bit-map for frame filtering. |
| ISU_HIGH | 0xC6 | 26 | r | High-priority frame address. |
| ISU_HIGH_MAP | 0xC7 | 8 | r/w | Bit-map for high priority frame address |
| ISU_FILTERED | 0xCA | 16 | r | Number of filtered frames |
| ISU_DROPPED | 0xCB | 16 | r | Number of dropped frames |
| ISU_MISALIGNED | 0xCC | 16 | r | Number of misaligned frames |
| ISU_DEBUG | 0xCD | 32 | r | Spy-glass into internal state. |
| ISU_RESET | 0xCF | — | w | Reset the ISU 10. |

The second channel is identical, except that the registers are in the range 0xD0–0xDF. They are named using an ISU2_... prefix.

Furthermore, each channel provides a two status flags to the INT_STATUS register:

TABLE 3

| Status name | Description |
|---|---|
| STAT_ISUDONE | Channel 1 has filled up its buffer. |
| STAT_ISUHIGH | Channel 1 has detected high-priority frame. |
| STAT_ISU2DONE | Channel 2 has filled up its buffer. |
| STAT_ISU2HIGH | Channel 2 has detected high-priority frame. |

Figure 6:
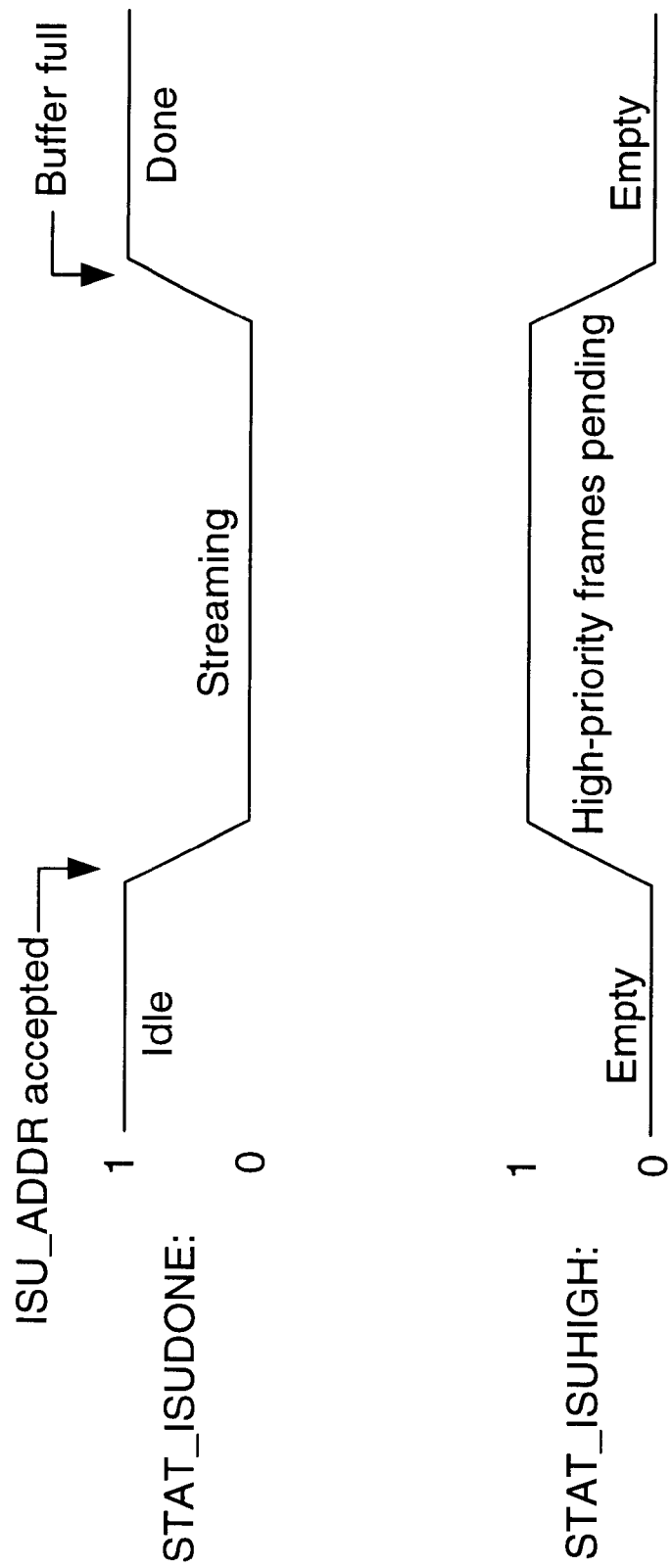
FIG. 6 illustrates status timing for two channels of the Input stream Unit.

FIG. 6 illustrates the status timing of a channel of the ISU 10. The firmware can either poll these flags or interface signals to provide the required status information or alternatively, configure an Interrupt Unit (not shown) to generate interrupts. A channel of the ISU 10 becomes ready to start as soon as an address is written to the ISU_ADDR register. This also de-asserts the STAT_ISUDONE status. When it subsequently receives an IxSYNC signal, the timestamp is recorded, the streaming operation starts: The operation continues until the full length of the buffer has been filled, at which time the STAT_ISUDONE status is asserted, and the ISU 10 stops, waiting for another write to the ISU_ADDR register. This write can be done while the unit is still streaming, making it immediately ready to start a new operation on the first IxSYNC signal following the end of the current operation. This will also immediately bring the STAT_ISUDONE status back to the de-asserted state. For disaster recovery, writing to the ISU_RESET pseudoregister does a hard local reset of both channels of the ISU 10, aborting any operation in progress.

Programming Model

Before starting to use a channel, the firmware will initialise the external input device. This is done by means outside the ISU 10, typically by using an provided 12C functionality of the IO Unit (not shown), or by connecting the device to dedicated IO pins. The channel is initialised by writing the appropriate value to the ISU_CONFIG register, matching the properties of the external device. If the previously described frame filtering is to be used, the firmware decides on which frame header bits should be significant in the hash value, and writes the bit-mask to the ISU_MASK register. It then calculates the hash value for each wanted pattern, and builds a bitmap which is written to the dSU_MAP register. During operation, the ISU_FILTERED register can be read, and this 16 bit counter indicates the number of frames that haves been discarded. This can be used to measure the effectiveness of the filter. The value simply wraps around: on overflow, and the firmware must interpret this correctly.

If the filter mask register (209, FIG. 5) and map are updated while data is streaming through, the filer mask should first be set to all-1s, in order to eliminate any false filtering while the update is taking place. If the high priority frame recogniser is to be used, the firmware builds a bitmap and writes it to the ISU_HIGH_MAP register. Then the buffer length is written to the ISU_LEN register, incorporating space for the 32-bit time-stamp prefix for each frame, and making any necessary adjustment for non-d-word frame sizes. The channel is then started by writing the memory buffer address to the ISU_ADDR register. It must be quad-d-word aligned, and the four least significant bits off the address are ignored. This activates the channel and data streaming starts as soon as the physical device such as the RF-demodulator indicates. start-of-frame.

When starting the ISU 10 initially, the address of a secondary buffer is also written to the ISU_ADDR register, allowing an immediate switch-over when the first buffer becomes full. While data is being streamed, the ISU_CURRENT register can be read to see the frame number currently being read, where the first frame has number 0. When this register changes to 1 it means that the part of the buffer corresponding to the first frame has been written, and can be inspected by the firmware, and so on for each subsequent frame. The intent is that this register can be used for polling. If an interrupt is desired for each frame, the buffer should simply be sized to contain one single frame. The value of ISU-CURRENT will jump to 0 when the ISU 10 switches to a new buffer. The firmware should interpret this accordingly. When the current buffer is full the STAT_ISUDONE status is asserted, and if a secondary buffer address has been written to the ISU_ADDR register, streaming immediately continues into this buffer starting from the next frame sync. The ISU_LEN register is accepted along with the ISU_ADDR register, and should be updated first in order to guarantee correct operation.

An interrupt service routine for the STAT_ISUDONE status will typically write a new secondary address to the ISU_ADDR register, and initiate the processing of the frame data. The time of receptions as well as the error status is available for each frame in the d-word preceding the frame data. Whenever a high-priority DVB MAC frame has been written to the memory buffer, its address is stored in the address-FIFO. The STAT_ISUHIGH status is asserted whenever the FIFO is non-empty, and can be used to generate interrupts in a level-sensitive fashion. Reading the ISU_HIGH register pulls the front-address out of the FIFO, de-asserting when the FIFO is empty. The ISU_DROPPED register contains statistical information. This register is 16 bits and holds the number of frames that is dropped because the ISU unit could not obtain ownership of the memory bus meaning that a data overflow situation inside the ISU unit has occurred. In this situation the ISU unit removes the frame from memory and increments the ISU_DROPPED register. The ISU_DROPPED register value simply wraps around on overflow, and the firmware must interpret this correctly.

The ISU_MISALIGNED register is 16 bits and holds the number of memory buffers that do not contain a hole number of frames. The situation occurs when the end of memory buffer is met, but the current frame being written is not finished. The MISALIGNED register is incremented, the end of the frame is discarded and the next frame is written in the next memory buffer. The MISALIGNED register value-simply wraps around on overflow, and the firmware must interpret this correctly.

Performance Issues

The ISU 10 has been assigned a very high arbitration priority in the present cable modem for getting access to the system memory bus (40, FIG. 1). This is needed in order to prevent overrun in the data FIFO buffers. Data is written to system memory in 4-d-word bursts. For a 10 M bytes-per-second input stream, this means one burst write per 1.6 micro seconds. The buffers are able to hold several more d-words that can receive data while the current 4-d-word block is being written.

As for firmware, the smaller the buffer, the lower latency before data processing can start. For fastest response, each buffer should contain a single frame (preceded by the time-stamp). This requires low interrupt latency in order to set-up the secondary buffer for the next frame.

Frame, filter performance drops off sharply as the number of wanted patterns increases. If the number of patterns is 5, and the header values are evenly distributed, there is only about a $5/32=15\%$ chance of a false positive, which means that 85% of the unwanted frames are discarded. If the number of wanted patterns is 25, then 78% of all unwanted packets will slip through the filter and must be discarded by the firmware.

Output Stream Unit

Figure 7:
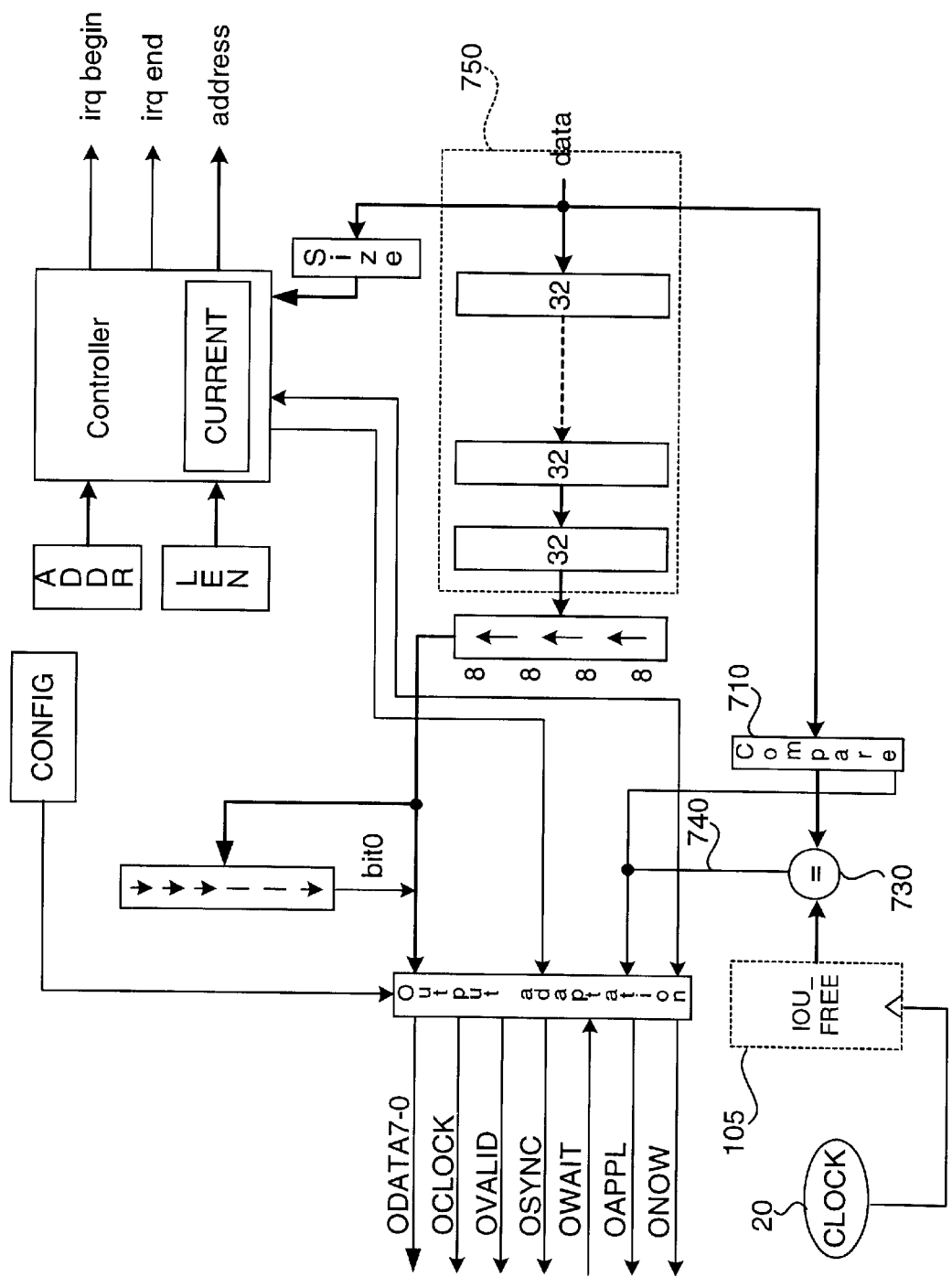
FIG. 7 is an Output Stream Unit (OSU) block diagram illustrating various circuit blocks of the OSU according to the present invention and a number of interface signals to/from the OSU.

FIG. 7 shows the OSU 30 in more detail, the unit 30 provides a high-bandwidth data-path out of the cable modem or NIU towards a head-end system or INA in DVB terminology. In these applications it is connected to the up-stream physical interface, and moves data from the system memory (60, FIG. 1) on to the physical interface. It supports a bit-wise or a byte-wise interface to the external device, e.g. a RF modulator. Outgoing data is dispatched with system-clock precision, by allowing the firmware to specify exactly when a data frame is to be sent, well in advance of the actual event. There is nothing in the OSU 30 that is specific to the DVB data formats or the MAC protocol. These issues, including synchronisation with the downstream data path, are handled by the firmware running on the CPU.

Architecture

Figure 8:
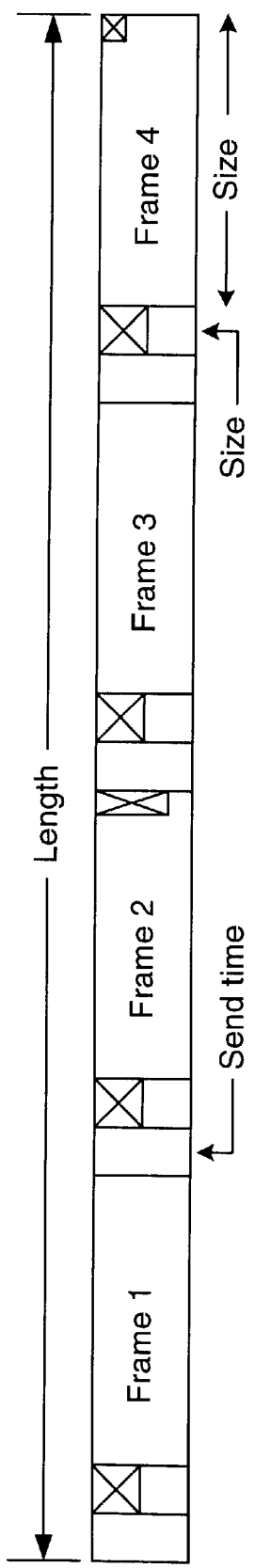
FIG. 8 illustrates an output buffer layout containing a number of time stamped outgoing data packets.

The OSU (30, FIG. 1) takes data from the frame memory area (not shown) of the system memory 60 and pipes it into the external device. Bandwidths up to 10M bytes-per-second are supported, and the OSU 30 has the necessary internal FIFO buffers to handle latency in getting access to system memory area 120. The stream data is aggregated into frames of varying size. The size is specified individually, and is dictated by the application context. For a DVB cable return channel the frame size is always 53 bytes. With DVB mini-slot support, some frames will be only 16 bytes. Data are clocked into the external device (not shwon) bit-wise or byte-wise. The start of each frame is indicated explicitly to the external device by a dedicated signal in the interface. There is also a wait-signal, OWAIT, that allows the external device to suspend the data transfer when its internal buffer is full. No data is actually transmitted by the external device until it receives a transmit-now signal, ONOW. This signal is generated inside the OSU 30 by comparing the value of the free-running counter, 105 of the interface unit to a pre-set value stored in register 710, and each frame is thereby dispatched with system-clock precision. The compare value of register 710 is preferably stored in the top 31 bits of a d-word. The least significant bit is fed through to the output device, as illustrated, and can be used for application-specific purposes. The d-word is read from the frame memory at the beginning of the memory buffer. After the d-word follows another d-word, whose bottom 16 bits specify the frame size in bytes as illustrated on FIG. 8. This is immediately followed by the stream data to be sent. The memory buffer can contain multiple consecutive frames, individually timed, and with individual frame size: The memory buffer is always filled with a whole number of d-words. Each d-word is transmitted using little-endian byte-ordering, so that the first byte to be transmitted is stored as the first byte in the buffer, and so on. If the frame length is not a multiple of four, the last 1–3 bytes have undefined value, and will not[]be sent. This must be taken into account when determining the buffer length. For multiple frames of 53 bytes each, it should be a multiple of 4+4+56=64 bytes.

When the buffer is empty the current operation is complete. A new operation can be pre-started from a separate memory buffer while the current operation is in progress. This allows for continuous data transmission without any urgent need to assign a new buffer once the current buffer is empty.

Hardware Interface

The OSU 30 owns the set of external pins interfacing to a physical output device:

| Pin name | Type | Description |
| --- | --- | --- |
| ODATA0–7 | Output | Data to physical interface. For serial data, only bit 0 is used. |
| OCLOCK | Output | Data clock signal to physical device, (derived from ASIC system clock) |
| OVALID | Output | Data valid qualifier. |
| OSYNC | Output | Frame start indicator. |
| OWAIT | Input | Device buffer full indicator. |
| OAPPL | Output | Application-specific control signal. |
| ONOW | Output | Transmit-now indicator. |

Data is delivered bit-wise or byte-wise, as configured by firmware, synchronised to the output clock signal. The polarity of the OCLOCK, OVALID, OSYNC, OWAIT and ONOW signals are also configurable by firmware. Similarly whether bit-wise data are little- or big-endian. The OWAIT signal is asserted by the external device if it is not able to accept any more data for the time being: A typical output device can buffer a full frame, and will never need to assert the OWAIT signal. The beginning of a frame is signalled to the external device by asserting the OSYNC signal when the first bit/byte is being clocked through. The OAPPL signal is driven along with the OSYNC signal, and its value is specified on a per-frame basis using the least significant bit of the send-time d-word. It can be left unconnected in case there is no application-specific use for it. The ONOW signal is used to signal that the external device should immediately start its transmission of the data transferred so far. This signal also functions as an implicit end-of-frame indication, for output devices supporting varying burst sizes. For this reason, the OSU will not start piping data for a new frame into the output device until the ONOW signal has been asserted, and the previous frame has begun transmitting. There is also a continuous mode, where data will be piped through to the output device, regardless of whether the time has reached the departure time-stamp when the ONOW signal is asserted. In a typical application, all frames will have the same size, and this may be explicitly configured into the external device. In this case it does not need to interpret the ONOW signal as an end-of-frame. This also allows it to have an internal buffer smaller than the frame size, and assert the OWAIT signal partially through the frame. As the frame starts transmitting (after the ONOW signal is asserted) the OWAIT signal will be deasserted, and the OSU will continue to pipe the rest of the frame into the external device.

Firmware Interface

The firmware operates the OSU 30 by writing to its registers, thereby activating it, and waiting until it signals the beginning or end of the current buffer. The OSU is self-contained, and while it is emptying a buffer the firmware can perform other tasks. The OSU contains the following device registers available to the firmware code:

| Register name | Number | Bits | R/W | Description |
|---|---|---|---|---|
| OSU_CONFIG | 0xB0 | 16 | r/w | Unit configuration:<br>bit 0: data width, 0=serial, 1=parallel<br>bit 1: bit endianness, 0=lsb first, 1=msb first<br>bit 2: OCLOCK polarity, 0=rising edge, 1=falling edge<br>bit 3: OVALID polarity, 0=active low, 1=active high<br>bit 4: OSYNC polarity, 0=active low, 1=active high<br>bit 5: OWAIT polarity, 0=active low, 1=active high<br>bit 6: ONOW polarity, 0=active low, 1=active high<br>bit 7: 0=frame-wise transmission, 1=continuous mode<br>bits 15–8: OCLOCK frequency divider |
| OSU_ADDR | 0xB1 | 26 | r/w | Address of memory buffer for send data. |
| OSU_LEN | 0xB2 | 16 | r/w | Length of memory buffer. |
| OSU_CURRENT | 0xB3 | 16 | r | Current frame being transmitted. |
| OSU_DEBUG | 0xBD | 32 | r | Spy-glass into internal state. |
| OSU_RESET | 0xBF | — | w | Reset the OSU. |

Furthermore, the OSU provides two status flags to the INT_STATUS register;

| Status name | Description |
|---|---|
| STAT_OSUDONE | The OSU has finished sending the whole buffer. |

The firmware can either poll this flag or can configure the Interrupt Unit to generate an interrupt. The OSU 30 becomes ready to start as soon as an address is written to the OSU_ADDR register. It will immediately start reading the memory buffer, first to get the send-time, and subsequently to read data for the first frame which will be delivered to the external output device. It then waits until the free-running counter 105 value matches the send-time, and signals the external device to start transmitting the frame. The operation continues for subsequent frames, until the full length of the buffer has been delivered, at which time the STAT_OSUDONE status is asserted, and the OSU stops, waiting for another write to the OSU_ADDR register. This write can be done while the unit is still streaming, making it immediately ready to start a new operation at the predetermined time specified in the beginning of the new buffer. For disaster recovery, writing to the OSU_RESET pseudo-register does a hard local reset of the OSU 30, aborting any operation in progress.

Programming Model

Before starting, the;firmware will initialise the external output device: This is done by means outside the OSU 30, typically by using the 12C functionality of the IO Unit, or by connecting the device to dedicated IO pins. The OSU is initialised by writing the appropriate value to the OSU_CONFIG register, matching the properties of the external device. The clock frequency divider is a number between 1 and 255, divided into the system clock frequency to produce the output data clock. The data to be sent is prepared and placed in the buffer, each frame prefixed with a d-word indicating its departure time, and a d-word containing the frame size. Then the buffer length is written to the OSU_LEN register, incorporating space for the 32-bit send-time and length prefix for each frame, and making any necessary adjustment for non-d-word frame sizes. The OSU is then started by writing the memory buffer address to the OSU_ADDR register. It must be quad-d-word aligned, and the four least significant bits of the address are ignored. This activates the unit, and data transmission starts as soon as the send-time is reached. The address of a secondary buffer can also be written to the OSU 30. This allows immediate chaining to the secondary buffer without any chance of missing a send opportunity. Typically two or more buffers will be used in rotation. While streamed, the OSU_CURRENT register indicates which frame is currently streamed to the external output device, where the first frame has number 0. When it changes to 1 it means the first part of the buffer is no longer used and the firmware can start writing new frame data into it, and so on for each subsequent frame. The intent is that this register can be used for polling. If an interrupt is desired for each frame, the buffer should simply be sized to contain one single frame. When the current buffer is empty the STAT_OSUDONE status is asserted. This means that the buffer can be recycled, and the firmware can start using it for preparing frames for future transmission. If a secondary buffer has been provided, it is immediately accepted, and the STAT_OSUDONE status is pulled back to the de-asserted state.

It is absolutely critical that the write to the OSU_ADDR register happens before the send-time of the first frame in the buffer. If it is too late, the free-running counter will have passed the send-time, and there will not be a match until a full wrap-around has happened. This will take about, 30 seconds for the suggested, 31 bit counter, and will be the wrong time anyway. The only option is to reset the OSU 30, and reschedule all pending transmissions.

In practise this means that the firmware must be prepared to submit a multi-frame buffer to the OSU 30 before it is filled to maximum capacity. If the buffer contains one or more frames that have been prepared for sending, it cannot wait for other frames to become available for sending if this would delay submission beyond the send-time of the first frame in the buffer.

Performance Issues

The OSU 30 has very high arbitration priority for getting access to the system memory bus (40, FIG. 1). This is needed in order to keep up with the external output device once transmission starts. Data is read from system memory in 4-d-word bursts. For a 10M bytes-per-second output stream, this means one burst read per 1.6 micro seconds. The internal buffers are able to hold several more d-words that can feed data out while the current 4-d-word block is being read. As for firmware, the smaller the buffer, the lower latency from processing data until transmission can start. For fastest response, each buffer should contain a single frame (preceded by the send-time and length). This requires low interrupt latency in order to set-up the secondary buffer for the next frame.

What is claimed is:

1. An apparatus for two-way communication of data in a time division multiplexed system, and comprising
    clock generator means for generating first and second clock signals,
    processor means for receiving the first clock signal and processing received data packets,
    an interface unit for receiving and intermediately storing incoming data packets from a head-end system and for intermediately storing and transmitting outgoing data packets to the head-end system, the interface unit comprising:
        time base means for receiving the second clock signal and generating a current time stamp value,
        input buffer means for receiving data of the incoming data packets, the input buffer means comprising:
            means for sampling the current time stamp value and associating the value with at least some of the incoming data packets, the time stamp value indicating an arrival time of the respective data packet, and
            data transfer means adapted to transmit data of the incoming data packets with any associated time stamps to a memory of the interface unit, and
        output buffer means for transmitting data of the outgoing data packets and comprising:
            data transfer means adapted to receive data of the outgoing data packets with associated time stamps from the memory of the interface unit, and
            means for comparing the time stamp value of each outgoing data packet with the current tithe stamp value, and for transmitting an outgoing data packet to the head-end system when said values match a predetermined relationship,
    the processor means being adapted to generate and associate the output time stamp with each outgoing data packet, the output time stamp indicating a departure time of the data packet, the output time stamp value being related to input time stamp values of selected incoming data packets.
    thereby permitting correct time-slot alignment of outgoing data packets in the time division multiplexed system.

2. An apparatus according to claim 1 which is a cable modem, or a set-top box.

3. An apparatus according to claim 1, wherein the means for sampling the current time stamp value are adapted to be controlled by a synchronization signal provided by a Radio-Frequency demodulator circuit connected to a physical data interface carrying the data packets.

4. An apparatus according to claim 2, wherein the cable modem or set-top box communicates with the head-end system according to the Digital Video Broadcast Interaction Channel for Cable TV Distribution Systems specifications.

5. An apparatus according to claim 1, wherein the means for associating a time stamp value with at least some of the intermediately stored incoming data packets are adapted to insert the time stamp value into at least some of the data packets.

6. An apparatus according to claim 1, wherein the means for associating a time stamp value with at least some of the intermediately stored a incoming data packets are adapted to insert the time stamp value into each of the data packets.

7. An apparatus according to claim 1, wherein the processor means are adapted to insert the output time stamp associated with each outgoing data packet into the outgoing data packet.

8. An apparatus according to claim 4, wherein the selected incoming data packets comprise Media Access Control frames of an MPEG stream, and the output time stamp value of outgoing data packet is related to time stamp value(s) of one or several of the selected Media Access Control frames.

9. An apparatus according to claim 1, wherein the clock generator means generates a clock frequency signal of at least 1 MHz.

10. An apparatus according to claim 1, wherein the clock generator means generates a clock frequency signal of at least 10 MHz.

11. An apparatus according to claim 1, wherein the clock generator means generates a clock frequency signal of at least 33 MHz.

12. An apparatus according to claim 1, wherein the clock generator means are adapted to, generate the first clock signal and the second clock signal synchronously with respect to each other.

13. An apparatus according to claim 1, wherein the first clock signal and the second clock signal are substantially identical.

14. An apparatus according to claim 1, wherein the time base means comprises at least one counter operating synchronously to the second clock signal.

15. An apparatus according to claim 1, wherein the time base means comprises a counter operating synchronously to the second clock signal to provide a current time stamp value of incoming data packets, and
    the comparison means are adapted utilize the current time stamp value of the counter to control departure times of an outgoing data packets.

16. An apparatus according to claim 14, wherein the counter is a binary modulo $2^N$ counter, N being an integer, number between 8 and 64.

17. An apparatus according to claim 1, wherein the interface is adapted to intermediately store at least two incoming data packets with associated time stamps at a time.

18. An apparatus according to claim 1, wherein the interface unit is adapted to intermediately store at least ten incoming data packets with associated time stamps at a time.

19. An apparatus according to claim 1, wherein the comparison means are adapted to initiate transmission of an outgoing data packet at a time when there is simple equality between the current time stamp value and the output time stamp value of the outgoing data packet.

20. An apparatus according to claim 1, wherein the processor means are adapted to manage the outgoing and incoming data packets by software running on the processor means.

21. An apparatus according to claim 20, wherein the apparatus is adapted to store at least a part of the data packet management software in any volatile memory selected from the group consisting of: EEPROM, Flash, EPROM, ROM.

22. An apparatus according to claim 20, wherein the data packet management software is adapted to determine output time stamp values of outgoing data packets based on input time stamp values of selected incoming data packets.

23. An apparatus according to claim 20, wherein the apparatus further comprises means for receiving remote instructions modifying the data packet management software running on the processor means so as to modify the processing of the received and/or transmitted data packets.

24. An apparatus according to claim 1, wherein the input buffer means further comprises a packet header filter for filtering a packet header code of an incoming data packet.

25. An apparatus according to claim 24, wherein the packet header filter further comprises means adapted to select and skip an incoming data packets if the data packets header code does not match one or several predetermined packet header codes.

26. An apparatus according to claim 25, wherein the packet header filter further comprises means adapted to transmit data of those incoming data packets to the memory of the interface unit that matches the one or several predetermined packet header codes.

27. An apparatus according to claim 26, wherein the packet header filter comprises means for calculating a hash value of a masked packet header, and a filter register to determine whether a packet header code of an incoming data packet is one of the one or several predetermined codes.

28. A method for two-way data communication in a time division multiplexed system, the method comprising the steps of:

generating first and second clock signals, providing the first clock signal to processor means, generating a current time stamp value based on the second clock signal, providing input buffer means receiving data of incoming data packets from a head-end system, sampling the current time stamp value and associating the sampled value with at least some of the received incoming data packets, the time stamp value indicating an arrival time of the respective data packet, transferring the data of the incoming data packets including data of data packets with associated time stamps to a memory of an interface unit, generating output time stamps, each stamp having a value related to input time stamp values of selected incoming data packets, generating outgoing data packets and associating the output time stamps with each outgoing data packet, the output time stamp value indicating a departure time of the outgoing data packet, transferring data of the outgoing data packets with associated time stamps from the memory of the interface unit to output buffer means, comparing the time stamp value associated with each outgoing data packet with the current time stamp value, transmitting data of an outgoing data packet from the output buffer means to the head-end system when said time stamp values match a predetermined relationship, thereby permitting correct time-slot alignment of outgoing data packets in the time division multiplexed system.

29. A method according to claim 28, further comprising the step of:

connecting a Radio-Frequency demodulator circuit to a physical data interface carrying the data packets, providing a synchronization signal generated by the Radio-Frequency demodulator circuit, and sampling the current time stamp value based on the synchronization signal.

30. A method according to claim 28, further comprising the step of:

storing the time stamp value associated with an incoming data packet in relation to the data packet.

31. A method according to claim 28, further comprising the step of:

storing an output time stamp in relation to each of the outgoing data packets.

32. A method according to claim 28, further comprising the step of:

operating at least one counter synchronously to the second clock signal.

33. A method according to claim 32, further comprising the step of:

generating the value of the current time stamp from a single counter operating synchronously to the second clock signal.

34. A method according to claim 28, further comprising the step of:

processing the received data packets by software running on the processor means.

35. A computer program for managing incoming data packets and generating outgoing data packets in an apparatus which provides two-way data communication in a time division multiplexed system, the computer program performing the steps of:

reading time stamped data packets from a memory of an interface unit, the time stamps indicating arrival times of the respective data packets, decoding the received data packets, determining whether a packet comprises a time indicator that indicates allowance of upstream transmittal of an outgoing data packet and a predetermined departure time, selecting at least some data packets comprising the time indicator, generating the outgoing data packet, calculating the output time stamp value associated with the outgoing data packet based on the time indicator and the arrival time stamp value of at least one selected data packet and additional transmit time information stored in the apparatus, intermediately storing the time stamped outgoing data packet in the memory of the interface unit, so as to allow output buffer means to read and transfer data of the outgoing time stamped data packet to output buffer means that controls the departure time of the data packet based on its associated time stamp value.

36. A computer program according to claim 35, further adapted to perform the steps of:

reading data based on user generated requests and generating outgoing data packets in response to the user data.

37. A computer program according to claim 36, further adapted to perform the steps of:

selecting incoming Media Access Control packets of a MPEG data stream, and generating the value of the output time stamps associated with the outgoing data packets based on the input time stamp values of MAC packets comprising the time indicator.

38. A computer program according to claim 35, where recorded on a data carrier.

* * * * *